(12) United States Patent
Schaller

(10) Patent No.: US 9,873,068 B2
(45) Date of Patent: Jan. 23, 2018

(54) MULTI-PANEL MOUNTING SECTION FOR LAUNDER CHANNEL COVER PANELS

(71) Applicant: Earle Schaller, Palm Beach Gardens, FL (US)

(72) Inventor: Earle Schaller, Palm Beach Gardens, FL (US)

(73) Assignee: NEFCO SYSTEMS, INC., Palm Beach Gardens, FL (US)

( * ) Notice: Subject to any disclaimer, the term of this patent is extended or adjusted under 35 U.S.C. 154(b) by 238 days.

(21) Appl. No.: 14/707,396

(22) Filed: May 8, 2015

(65) Prior Publication Data
US 2016/0016098 A1    Jan. 21, 2016

Related U.S. Application Data

(60) Provisional application No. 61/990,914, filed on May 9, 2014.

(51) Int. Cl.
*B01D 21/00* (2006.01)

(52) U.S. Cl.
CPC ..... *B01D 21/0003* (2013.01); *B01D 21/0006* (2013.01)

(58) Field of Classification Search
CPC ............ B01D 21/0003; B01D 21/0006; B01D 21/2433
USPC ......................................................... 220/216
See application file for complete search history.

(56) References Cited

U.S. PATENT DOCUMENTS 4,262,882 A * 4/1981 Simcoe ............... E04H 17/1434
256/22
5,965,023 A * 10/1999 Schaller ............. B01D 21/0003
210/528

\* cited by examiner

*Primary Examiner* — James N Smalley
(74) *Attorney, Agent, or Firm* — Sofer & Haroun, LLP

(57) ABSTRACT

A cover arrangement is provided for a launder channel of a clarifier tank. The clarifier tank has an arcuate outer circumferential wall and a weir wall, with the launder channel disposed between the walls. The cover arrangement has a single mounting section configured to be coupled to the arcuate outer circumferential wall and a plurality of cover sections, each of which are coupled to the same single mounting section at different locations. The cover sections are configured to extend from the arcuate outer circumferential wall inwards towards the center of the clarifier tank covering the launder channel.

4 Claims, 6 Drawing Sheets

Single Panel Mounting Section

MULTI-PANEL MOUNTING SECTION FOR LAUNDER CHANNEL COVER PANELS

RELATED APPLICATION

This application claims the benefit of priority from U.S. provisional patent application No. 61/990,914, filed on May 9, 2014, the entirety of which is incorporated by reference.

BACKGROUND

Field of the Invention

This invention relates to waste treatment plants. More particular, the present arrangement relates to an improved cover arrangement for waste treatment plants.

Description of Related Art

A major nuisance in wastewater treatment plants around the country is the presence of algae on the surfaces of the treatment plant clarifiers. Algae grow in the presence of nutrients in the treated water and coat the surfaces of the launder trough, the weirs and scum baffles in the clarifier. Not only are the algae nuisances, but algae can build up to the point that they effect the hydraulic flow in the clarifier, they clog filters downstream and reduce the efficiency of the UV processes designed to further cleanse the outgoing water (the effluent) from the clarifier.

The most effective way to reduce algae growth in the clarifier is to cover the susceptible areas from sunlight to inhibit the growth of the algae. For this purpose, covers, usually of fiberglass, are installed over the effluent trough of a clarifier. The cover is a system of molded panels that attach to the wall of the clarifier and extend from the outer tank wall over the launder and weir and to a point inside the scum baffle thus protecting this entire area from direct sunlight and inhibiting the growth of algae on the surfaces below. The covers are hinged to allow the covers to open for inspection and maintenance. FIG. 1 shows a prior art image illustrating a typical launder channel with a cover there over and FIG. 2 shows a perspective view illustrating a plurality of covers in series, mounted around the launder channel to cover the entire channel.

Each of the cover sections in a typical prior art arrangement are made from two parts, a mounting section that attaches to either the tank wall or the weir wall of the clarifier and serves as the base for the second part, the hinged cover section that opens and closes. As shown in prior art FIG. 3, the two sections are fastened together with a continuous hinge. If the mounting section is fastened to the inner wall of the clarifier, the cover section opens toward the outer wall of the tank; if the mounting section is attached to the weir wall of the clarifier, the cover section opens toward the center of the tank.

Launder covers of this type for circular clarifier tanks are designed to follow the curvature of the clarifier wall. Typically, the outer edge of cover sections are approximately 6' long, with the edges of the cover aligned radially inward toward the center of the tank. The mounting sections are proportionally smaller. The cover system as a whole is designed to cover the circumference of the clarifier with an even number of equal size panels to avoid the need to trim or add panels. As an example, the cover for a 100-foot diameter clarifier might normally consist of fifty four (54) individual cover sections, each 5'9⅞" long. The mounting section would be approximately 5' long.

Consideration must also be given to the type of cover provided. Some cover systems feature a series of identical cover panels that are spaced ¼" to ½" apart to allow room for a gasket between the cover panels to keep light from reaching the surface below. Other covers incorporate 3" molded tabs at each end of alternate cover panels to extend over the seam between panels to keep out the light. A third has a molded tab at one end of the panel that allows the panels to be opened in a particular sequence. In all of these cover arrangements, both tank wall mounted and launder all mounted, the alignment of the panels and the space between panels is critical to the performance and the appearance of the cover and must be maintained.

These above prior art arrangements present a major issue with the prior art. While the cover is designed for a perfect circle, the walls of the tank and the launder wall are formed using chorded plywood forms and the result is a wall that is only approximately circular. Rather than a smooth circular surface, the cover is often mounted to a highly irregular surface of short chords. When the mounting sections are attached to this surface, it takes on a direction roughly perpendicular to the angle of the small section of the wall where it is mounted, and the attached cover sections follow suit. The adjacent sections may point in a slightly different direction causing the panel members to be mis-aligned relative to one another causing air/sunlight gaps and otherwise affecting the ability of the cover sections to open and close properly.

A second challenge to maintaining the alignment is dependent on the installation contractor. The required spacing between mounting sections is typically in the range of ¼" to ½." This spacing is developed in the cover design equations and is used to ensure that the number of panels provided fits the circumference of the clarifier without the need to cut preformed panels on-site or add partial panels.

OBJECTS AND SUMMARY

The present arrangement greatly simplifies the process of aligning individual cover panels by building the alignment into a multi-panel mounting section capable of supporting as many as four separate cover panels. The elongated mounting section is molded to the curvature of the wall and, due to its length, provides a smooth, stable mounting platform for the cover that eliminates or reduces the variations in the tank wall. Firstly since the mounting section supports multiple panels on the other non-mounting side there are no alignment issues with those panels. Additionally, even between two multi-panel mounting section segments, because the longer mounting section spans two or more irregular surfaces of the short chords in the un-even tank or weir wall it tends to even out causing less misalignment issues.

To this end, the present arrangement is directed to a cover arrangement for a launder channel of a clarifier tank. The clarifier tank has an arcuate outer circumferential wall and a weir wall, with the launder channel disposed between the walls.

The cover arrangement has a single mounting section configured to be coupled to the arcuate outer circumferential wall and a plurality of cover sections, each of which are coupled to the same single mounting section at different locations. The cover sections are configured to extend from the arcuate outer circumferential wall inwards towards the center of the clarifier tank covering the launder channel.

BRIEF DESCRIPTION OF THE DRAWINGS

The present invention can be best understood through the following description and accompanying drawings, wherein.

DETAILED DESCRIPTION OF THE DRAWINGS

Figure 4:
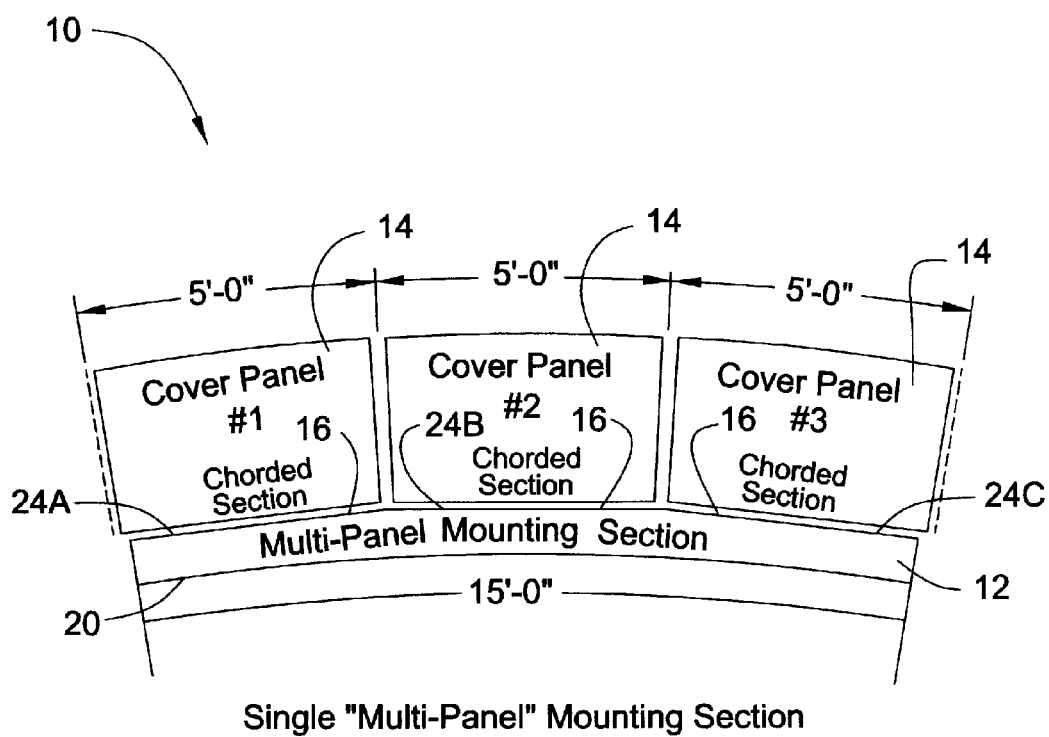
FIG. 4 is a top view of cover sections and a multi-cover section mounting section in accordance with one embodiment.

The present arrangement as illustrated for example in FIG. 4, illustrates a cover arrangement 10 in accordance with one embodiment. Cover arrangement 10 includes a mounting section 12 and three cover sections 14, each of which are connected to mounting section 12 via a continuous hinge 16. In a preferred embodiment, each mounting section 12 includes three cover sections 14 but it is understood that the invention may include other numbers such as four cover sections 14 per mounting section 12 without deviating from the scope of invention. Mounting section 12 and cover sections 14 are typically constructed of fiberglass, but the material is not limited in that respect. As shown in FIG. 4, mounting section 12 is typically fifteen (15) feet long (or otherwise cover fifteen (15) feet of the curved outer tank wall). Each of cover panels 14 are about five (5) feet long, the width being enough to extend over the launder channel. Again it is understood that such dimensions are exemplary and are not intended to limit the scope of the invention.

As shown in FIG. 4, mounting section 12 has a first curved side 20 which is configured to be mounted to the arcuate outer circumferential wall of the clarifier tank. The other side 22 of mounting section 12 is chorded into several chorded sections 24A-24B so as to be configured to couple with the plurality of cover sections 14 mounted thereto. As noted above, the elongated mounting section 12 is molded to the curvature of the wall and, due to its length, provides a smooth, stable mounting platform for cover arrangement 10 that eliminates or reduces the variations in the tank wall. Because mounting section 12 supports multiple cover sections 14 on non-mounting chorded side 22 there are no alignment issues with those cover sections 14. Additionally, even between two adjacent mounting section 12, because the longer mounting section spans two or more irregular surfaces of the short chords in the un-even tank (or weir wall if mounted at that alternative location) the arrangement tends to even out around the entire launder channel causing less cover section 14 mis-alignment issues.

Figure 1:
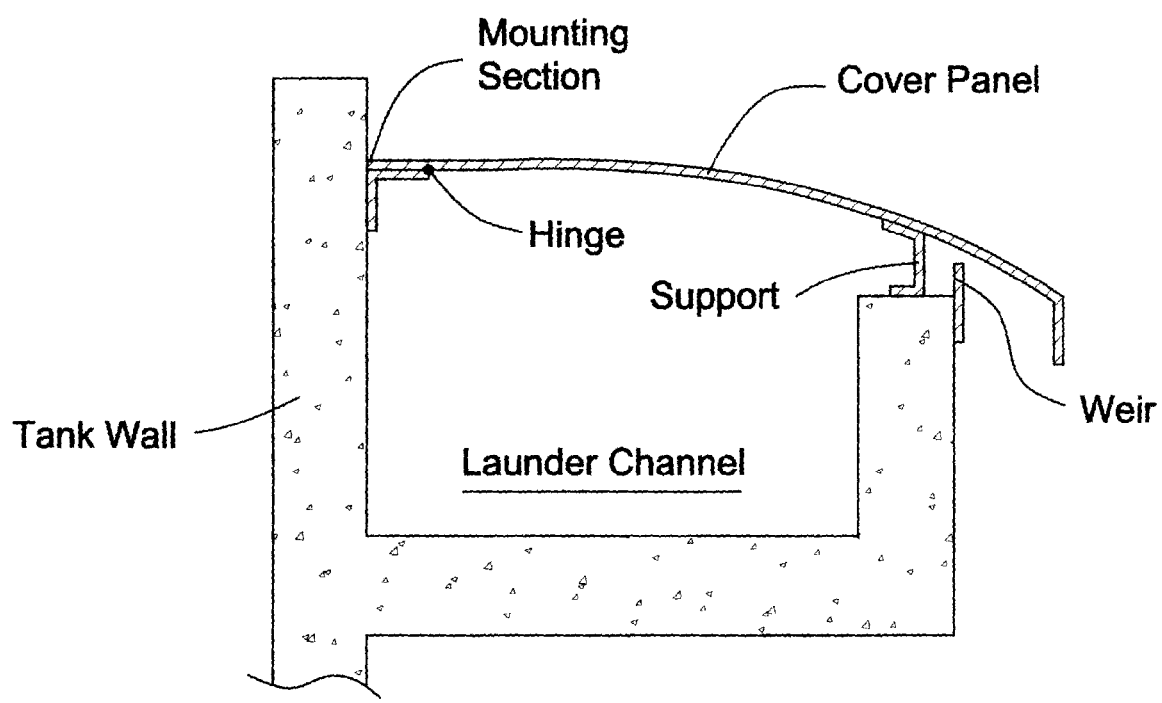
FIG. 1 shows a clarifier tank and launder channel with a prior art cover.
Figure 2:
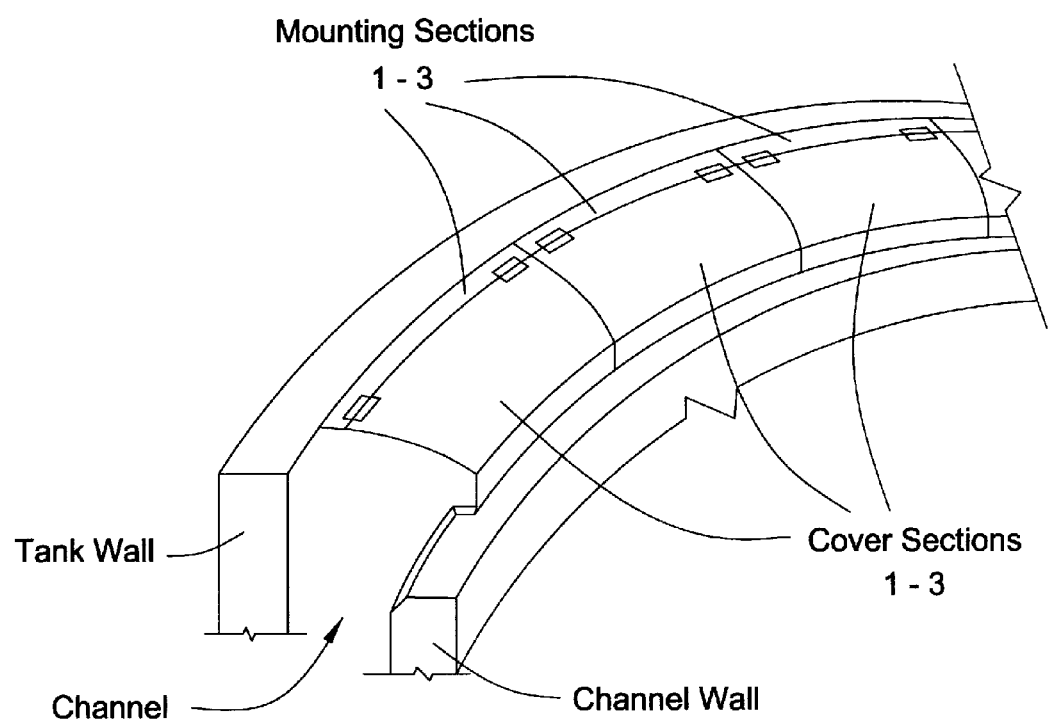
FIG. 2 shows a perspective view of a clarifier tank and launder channel with prior art cover sections.
Figure 3:
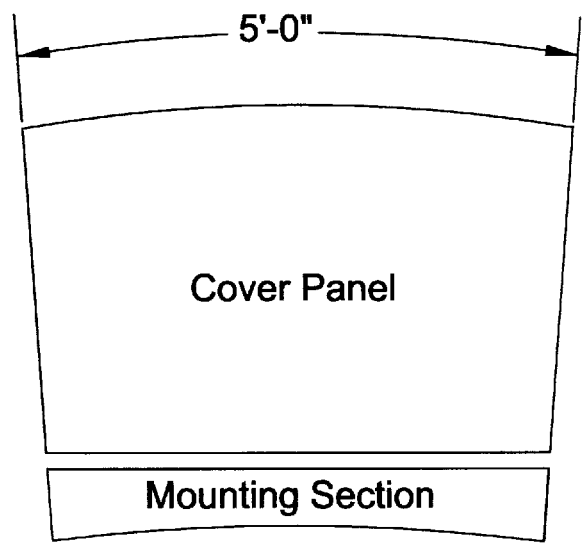
FIG. 3 is a top view of a prior art cover section and mounting section.
Figure 5:
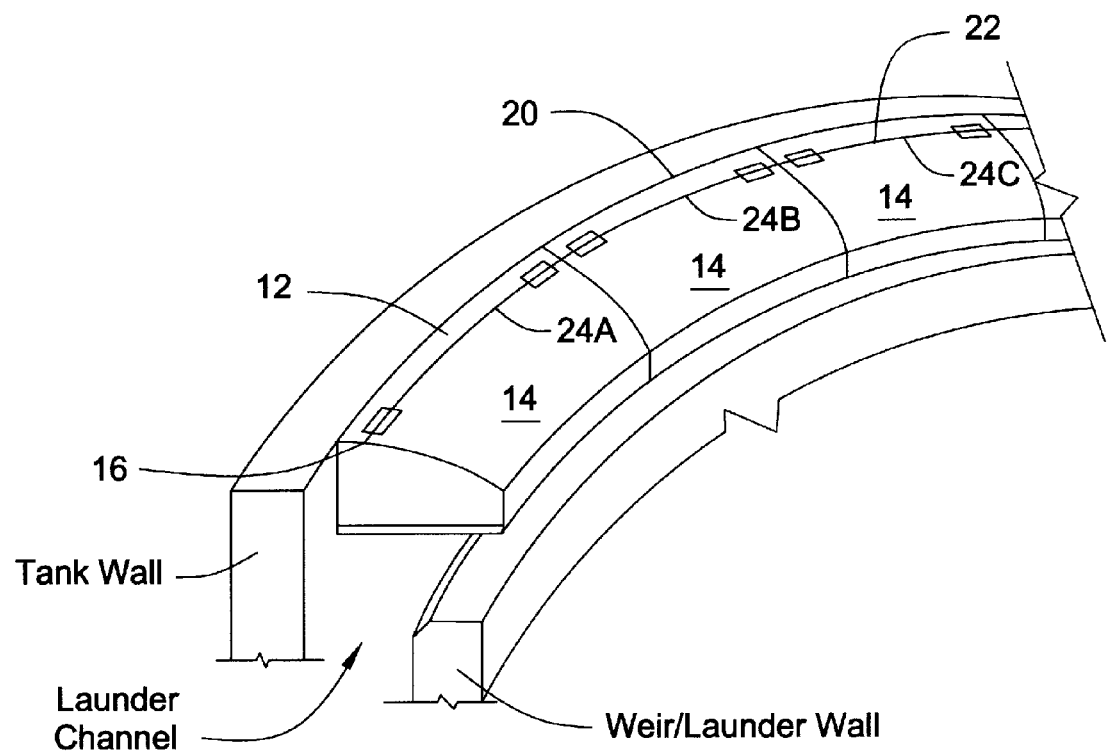
FIG. 5 is a perspective view of the cover sections and the multi-cover section mounting section of FIG. 4 in accordance with one embodiment.

FIG. 5 illustrates a perspective view of cover arrangement 10 disposed over a launder channel similar to that shown in prior art FIG. 2, but illustrating the single mounting section 12 for multiple cover sections 14. As an example, of a full installation using present cover arrangement 10, a typical 100' clarifier tank and associated launder channel may require fifty four (54) cover sections 14 to completely cover the launder channel.

In the prior art that would mean fifty four (54) prior art mounting sections would be required, each needing to be properly aligned or corrected to account for the irregular wall shape of the outer tank wall. However, using the present arrangement, because multiple cover sections 14, such as for example three cover sections 14, are supported by a single mounting section 12, the same 100' tank and associated launder channel would only take eighteen (18) mounting sections 12, reducing the amount of adjustments required because of irregular tank wall shapes, and reducing installation time.

In accordance with one embodiment, the present mounting section 12 can be mounted to the tank wall or to the launder wall. As an additional advantage, to accommodate cover panels 14, an appropriately sized chorded section 24A-24C is molded into the mounting section 12 for each of cover section 14. When hinges 16 for each cover section 14 are attached to mounting section 12, cover sections 14 are separated by the exact space required (e.g. as per the building/design specification) and precisely aligned radially toward the center of the tank. This arrangement reduces the number of individual cover sections 14 that need to be aligned, makes the alignment more precise and lessens the time required to install cover arrangement 10.

Figure 6:
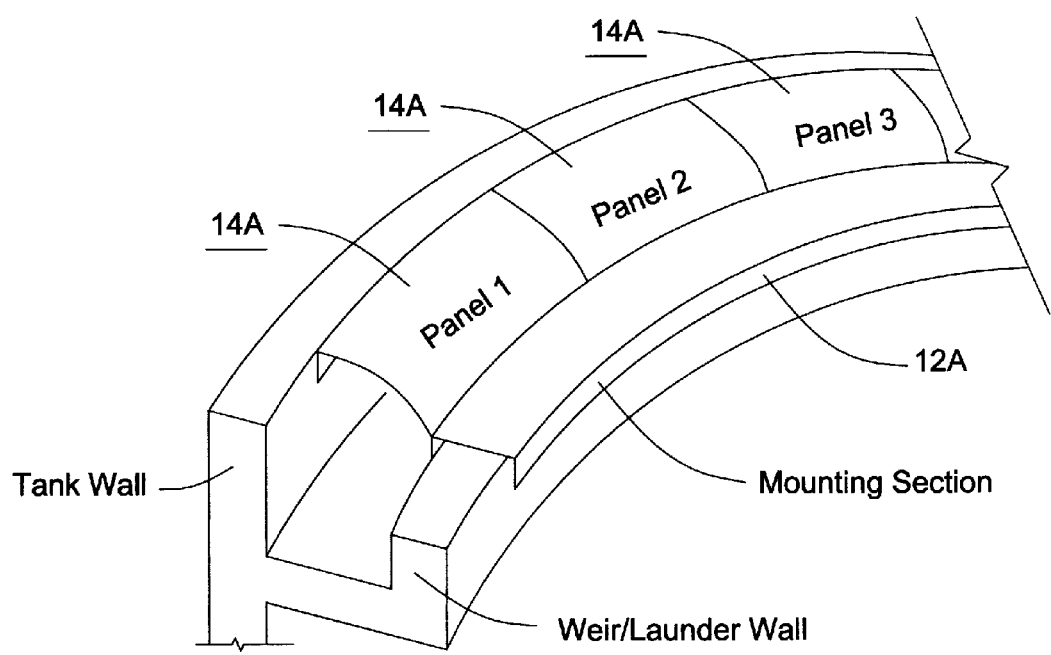
FIG. 6 is a perspective view of the cover sections and the multi-cover section mounting section in accordance with another embodiment.

As noted briefly above, the present arrangement further contemplates that instead of mounting section 12 being coupled to the tank wall with cover sections 14 extending towards the weir wall to cover the launder channel, the reverse arrangement is also within the scope of this invention. For example FIG. 6 shows the alternative arrangement where mounting section 12a is coupled to the weir wall of the launder channel. The weir wall, also constructed of concrete has the same irregular non purely circular chording issues as the tank wall, thus a single mounting section 12a reduces the number of attachments and angle adjustments necessary to cover an entire launder channel. As with the above embodiments, multiple cover sections 14a couple to a single mounting section 12a, but in this case they are hinged near the weir wall and extend outward to the outer tank wall so as to cover the launder channel.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A cover arrangement for a launder channel of a clarifier tank, the clarifier tank having an arcuate outer circumferential wall, a weir wall, with the launder channel disposed between said walls, said cover arrangement comprising:
   a single mounting section, configured to be coupled to said arcuate outer circumferential wall; and
   a plurality of cover sections, each of which are coupled to the same single mounting section at different locations, said cover sections being configured to extend from said arcuate outer circumferential wall inwards towards the center of the clarifier tank covering said launder channel,
   wherein said single mounting section has a first curved side mounted to said arcuate outer circumferential wall and a second chorded side with a plurality of chorded sections, each of which correspond with one of said plurality of cover sections mounted thereto.

2. The cover arrangement as claimed in claim 1, wherein said single mounting section supports three cover sections.

3. The cover arrangement as claimed in claim 1, wherein said plurality of cover sections are each coupled to the same single mounting section via a continuous hinge.

4. The cover arrangement as claimed in claim 1, wherein said cover arrangement includes a plurality of mounting sections each with its own plurality of cover sections, configured to cover the entire launder channel.

* * * * *